United States Patent
Ratier

(10) Patent No.: US 10,440,056 B2
(45) Date of Patent: Oct. 8, 2019

(54) METHOD FOR DEPLOYING AN APPLICATION IN A SECURE ELEMENT

(71) Applicant: MORPHO, Issy-les-Moulineaux (FR)

(72) Inventor: Jean-Baptiste Ratier, Issy-les-Moulineaux (FR)

(73) Assignee: Idemia Identity & Security, Issy les Moulineaux (FR)

( * ) Notice: Subject to any disclaimer, the term of this patent is extended or adjusted under 35 U.S.C. 154(b) by 295 days.

(21) Appl. No.: 15/185,827

(22) Filed: Jun. 17, 2016

(65) Prior Publication Data

US 2017/0099320 A1 Apr. 6, 2017

(30) Foreign Application Priority Data

Jun. 17, 2015 (FR) .................................... 15 55552

(51) Int. Cl.
*H04L 29/06* (2006.01)
*G06F 21/72* (2013.01)
(Continued)

(52) U.S. Cl.
CPC ............ *H04L 63/168* (2013.01); *G06F 21/72* (2013.01); *G06Q 20/3227* (2013.01);
(Continued)

(58) Field of Classification Search
CPC . H04L 63/0457; H04L 63/061; H04L 63/168; H04L 63/0853; G06F 21/72;
(Continued)

(56) References Cited

U.S. PATENT DOCUMENTS 8,196,131 B1 * 6/2012 von Behren ......... G06Q 20/367
705/64
8,646,059 B1 * 2/2014 von Behren ......... G06Q 20/367
719/311
(Continued)

FOREIGN PATENT DOCUMENTS

EP 2 388 968 A1 11/2011

OTHER PUBLICATIONS

Secretariat@globalplafform.org: "GlobalPlatform's Proposition for NFC Mobile: Secure Element Management and Messaging", White Paper, Apr. 2009, 36 pages URL: http://www.sicherungssysteme.net/fileadmin/GlobalPlatform_NFC_Mobile_White_Paper.pdf (last retrieved on May 2, 2016).

*Primary Examiner* — Amir Mehrmanesh
(74) *Attorney, Agent, or Firm* — Muncy, Geissler, Olds & Lowe, P.C.

(57) ABSTRACT

Method for deploying an authentication application in a secure element of a communication terminal comprising a non-secure processing unit executing a program for calling the authentication applications. The method comprises the step of transferring via at least one communication network data between a first trusted server associated with a provider of the security element so as to execute a first program for managing the security element, a second trusted server associated with at least one provider of authentication applications so as to execute a program for managing authentication applications, and the communication terminal, so as to create in the secure element a secure domain and install the authentication application therein.

8 Claims, 1 Drawing Sheet

(51) Int. Cl.
*G06Q 20/34* (2012.01)
*G06Q 20/32* (2012.01)
*H04W 4/50* (2018.01)
*H04W 12/04* (2009.01)

(52) U.S. Cl.
CPC ..... *G06Q 20/3278* (2013.01); *G06Q 20/3552* (2013.01); *H04L 63/0457* (2013.01); *H04L 63/061* (2013.01); *H04L 63/0853* (2013.01); *G06F 2221/2115* (2013.01); *H04W 4/50* (2018.02); *H04W 12/04* (2013.01)

(58) Field of Classification Search
CPC .......... G06F 2221/2115; H04W 4/001; H04W 12/04; G06Q 20/3552
See application file for complete search history.

(56) References Cited

U.S. PATENT DOCUMENTS

| | | | | |
|---|---|---|---|---|
| 2007/0220494 | A1* | 9/2007 | Spooner | G06F 8/30 717/130 |
| 2009/0172657 | A1* | 7/2009 | Makelainen | G06F 9/44521 717/174 |
| 2012/0089481 | A1* | 4/2012 | Iozzia | G06F 21/31 705/26.41 |
| 2013/0205414 | A1* | 8/2013 | Jussila | H04L 63/04 726/30 |
| 2015/0339599 | A1* | 11/2015 | Lee | G06Q 10/02 705/51 |

* cited by examiner

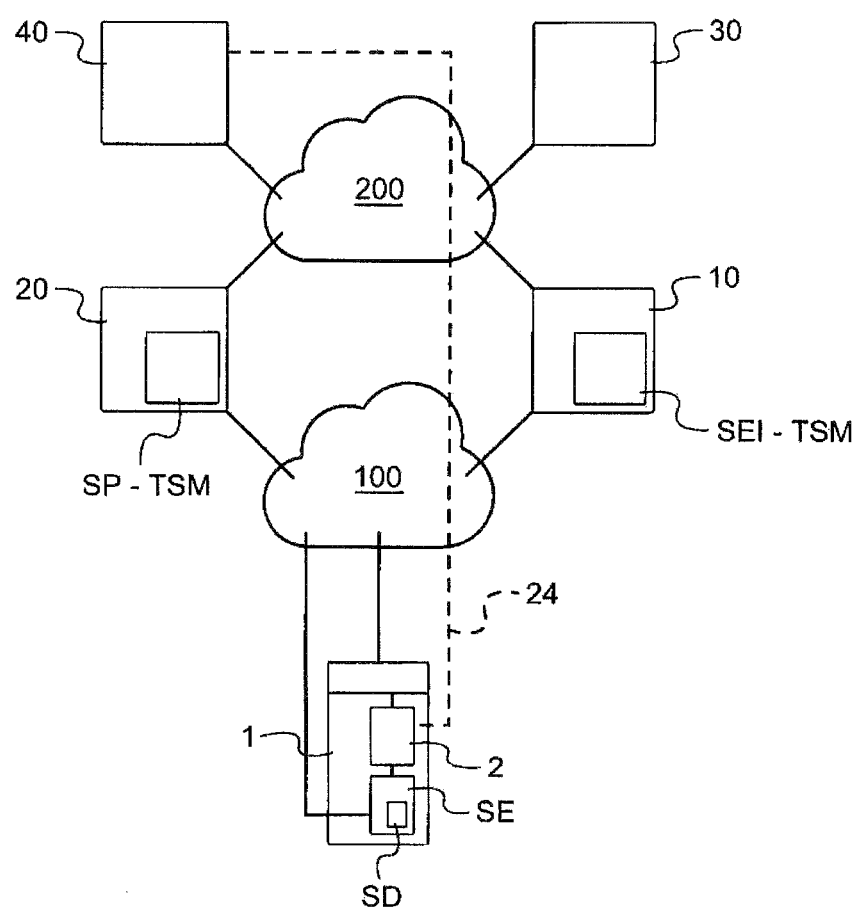

METHOD FOR DEPLOYING AN APPLICATION IN A SECURE ELEMENT

The present invention relates to the secure execution of an application in a mobile communication terminal so as for example to use the mobile terminal as an authentication means for the purposes in particular of accomplishing a payment operation, of accessing a place or else of proving the identity of the owner of the mobile object.

PRIOR ART

The use of mobile telecommunication terminals, such as mobile telephones, to perform sensitive operations requiring authentication, such as payment operations, is known. In such operations, the mobile telephone plays the role of a payment or credit card and exchanges data with the payment terminal of traders through a wireless communication technology of the near field communication or NFC type. The telephone executes a mobile payment application which will ensure the authentication of the user as does a conventional payment or credit card.

It is understood that the feasibility of these operations relies on the certainty that the data and the mobile payment applications cannot be altered or modified by a fraudster. To this end, the sensitive data and applications are stored, processed or executed by a secure element contained in the telephone.

A secure element is an electronic circuit designed to contain applications and data in a secure manner, execute the applications, and ensure secure transfer of the data. The secure element comprises a processor and storage means which are designed to resist manipulations with a view to accessing the applications and the data without authorization. The secure element is thus for example a removable integrated circuit card (such as a SIM card or an SD card) or a dedicated circuit soldered on an electronic card of the mobile telephone (the secure element is then termed "embedded"). The secure element can also be obtained in a software manner by defining within the processor of the telephone a secure (encrypted) area accessible by means of a decryption key.

Two types of entities must therefore cooperate to guarantee this security:
- the provider (or owner) of the secure element (customarily identified by the abbreviation SEI standing for "Secure Element Issuer") who holds all the technical information making it possible to intervene on the secure element and ensures the proper operation thereof,
- the service providers (customarily identified by the abbreviation SP), such as banking or credit bodies, that provide the mobile payment applications and ensure the proper operation thereof, initiate requests to change or update the applications, and control the definitive blocking or suspension of their use. The secure element can contain several mobile payment applications, or other applications, each associated with a service provider or with an account of the user with a service provider.

In order that everything operate dependably in respect of all the parties, it is important to guarantee that the provider of the secure element not be allowed direct access to the secure element and therefore to the applications and data of the service providers. In the same manner, it is important to guarantee that the service providers not be allowed direct access to the secure element and therefore to the applications and data of the other service providers. To this end, the provider of the secure element interacts with the secure element via a first trusted server executing a first manager program and the service providers interact with the secure element via a second trusted server executing a second manager program. The manager programs are devised by trusted third parties and communicate with one another and, for the former, with the provider of the secure element and, for the latter, with the service providers. The first manager program is designed to ensure the management of the accesses and of the allocation of the memory spaces and rights in relation to the secure element (one speaks of the allocation of a secure domain within the secure element). The second manager program manages the installation and the operation of the applications in the secure domains allocated by the first manager program.

The security relies on encryption methods and exchanges of keys between the applications and the manager programs.

The user can have several mobile payment applications in his secure element. Provision is made for a program for calling the mobile payment applications (this calling program forms an interface between the user and the mobile payment application). This calling program, for example that offered under the name GOOGLE WALLET by the American company GOOGLE, is executed by the processor of the telephone, outside of the secure element, and allows the user of the telephone to select the mobile payment application to be used for the payment.

The calling program is authorized to launch the execution of the mobile payment applications by the secure element but also to dispatch requests to the service providers asking for the installation of new mobile payment applications at the behest of the user of the telephone.

On receipt of such a request, the service provider, the bank in the present example, verifies the user's eligibility for this service, that is to say it determines whether the user has sufficient financial resources to have a mobile payment application. If appropriate, an eligibility agreement and the data necessary for the configuration of the mobile payment application are returned to the second manager program by the bank.

The second manager program then sends a request to the first manager program, asking for the deployment of a mobile payment application in the secure element. The first manager program then verifies the technical compatibility of the mobile payment application with the secure element of the telephone in question. If appropriate, the first manager program sends a confirmation of compatibility to the second manager program which returns a request to create a secure domain in the secure element of the telephone in question. Once the secure domain has been created, the first manager program informs the second manager program thereof and sends it a key for access to the said secure domain. In parallel with the creation of the secure domain, the program for installing the mobile payment application is prepared by the second manager program and sent to the first manager program which verifies the technical content thereof. The program for installing the mobile payment application is thereafter loaded, executed and customized in the secure domain of the secure element. Once the mobile payment application has been installed and configured, the second manager program informs the bank thereof and the user can execute, via the calling program, the newly installed mobile payment application.

The set of procedures for loading, installing and operating applications on secure elements has been defined by an association named GLOBALPLATFORM grouping together industries from the sector (see for example the document "GlobalPlatform's proposition for NFC Mobile: Secure Element management and Messaging", White Paper, April 2009, published by the company GlobalPlatform Inc.).

The implementation of these procedures requires numerous successive exchanges of data between the various parties involved, and the secure element of the telephone. A data transmission chain is thus formed. The calling program itself intervenes only at the start of the process to request the installation of an application and then at the end of the process to launch the application. Like any exchange of data between the manager programs, the service provider and the provider of secure elements requests the opening of a private communication channel (also called a VPN channel), the division and the multiplication of the exchanges give rise to significant unwieldiness which slows down the deployment of the mobile payment applications since it is necessary for all the parties of the chain to be available at the same time or else the data are blocked, the private communication channel is closed and will have to be reopened later. It follows from this that the implementation of the whole process is lengthy and expensive, the progress of the process being conditioned by the slowest party.

A method for loading an application in an integrated circuit card is known from document EP-A-2388968. This method implements a suite of commands customarily called STK ("SIM Application toolkit") and a Web server in order to be able to choose an application to be loaded. As previously, the exchange of data between the parties is performed by setting up direct relations between the parties, and this may give rise to difficulties when the parties are not available at the same time. The Web server furthermore constitutes an additional party, complicating the exchanges.

OBJECT OF THE INVENTION

An aim of the invention is to propose a method of installing an application in a secure element which is simpler and faster while being reliable and secure.

BRIEF ACCOUNT OF THE INVENTION

For this purpose, there is provided, according to the invention, a method for deploying an application in a secure element of a communication terminal comprising a non-secure processing unit executing a program for calling the applications in the secure element. The method comprises the step of transferring via at least one communication network data between a first trusted server associated with a provider of the secure element so as to execute a first program for managing the secure element, a second trusted server associated with at least one provider of authentication applications so as to execute a second program for managing applications of the secure element, and the communication terminal, so as to create in the secure element a secure domain and install the application therein. The method comprises the steps of:
  establishing a first exchange of data between the application provider and the calling program so as to obtain an authorization to install the application,
  establishing a second exchange of data between the first management program and the calling program so as to create the secure domain in the secure element and transfer a key for access to the secure domain to the calling program,
  establishing a third exchange of data between the second management program and the calling program so as to transfer the access key to the second management program and prohibit the subsequent use of the access key by the calling program to access the secure domain,
  having the second management program download and install the application in the secure domain.

Thus, the calling program also ensures the centralization of the data streams between the trusted servers. The addition of this intermediary makes the data exchanges more fluid since overall it is more available than the trusted servers so that it is easier to exchange data between each of the trusted servers on the one hand and the calling program on the other hand. Furthermore, only two sessions of data exchanges are opened between the calling program and the trusted servers: a first session of exchanging data with the first management program, and then a second session of exchanging data with the second management program. The trusted servers have no direct dialogue with one another.

The calling program is a piece of software or an application which executes on the communication terminal (tablet, mobile telephone, a computer etc.) linked to the communication network for example to the Internet network.

The calling program can be made available by:
  a provider of the secure element having access to the secure element incorporated within the terminal or connected to the terminal;
  an application provider that offers a service to the user;
  a terminal constructor; or
  a provider of a computer program for operating the terminal.

The calling program is designed according to the invention in particular to:
  receive a request, originating from an application provider, for the creation of a secure domain;
  open a secure connection with the first management program so as to transfer the key and carry out the transaction of creating the secure domain on the secure element;
  ensure that the transaction of creating the secure domain on the secure element has terminated;
  recover the key for access to the Secure Domain with if possible the sharing of an enciphering key of the latter;
  open a secure connection with the application provider so as to share the key for access to the secure domain;
  ensure that the transaction of loading the application into the secure domain has terminated.

Once the application has been installed, the calling program can be designed to ensure the tie with an operator to use the application in the secure element, for example to ensure a contactless payment or else to play the role of payment terminal during a payment via the Internet network.

Other characteristics and advantages of the invention will emerge on reading the following description of a nonlimiting particular mode of implementation of the invention.

BRIEF DESCRIPTION OF THE FIGURES

Reference will be made to the single appended FIGURE illustrating the implementation of the method of the invention.

DETAILED DESCRIPTION OF THE INVENTION

The invention is described by way of example to a mobile payment application, that is to say that the mobile telephone is used as a payment card.

With reference to the FIGURE, the mobile telephone used for the implementation of the invention, labeled 1, is a GSM telephone of smartphone type comprising:

- a non-secure processing circuit, symbolized by 2, comprising a processor (the main processor of the telephone) and memories for executing an operating program (customarily called O.S.) and diverse applications (telephony, connection to the INTERNET network, messaging, file management, camera, geolocation, calendar, radio, notepad, calculator, games etc.),
- a secure element (SE) comprising processing means (a processor) and a memory which are usable only when one has a key. The secure element may receive short messages (customarily called SMSs) without the latter passing through the non-secure processing circuit 2. The secure element is here a circuit soldered to the electronic card of the mobile telephone 1.

The memory of the non-secure processing circuit (the expression "non-secure" is used here as opposed to the secure element) contains a calling program which is executed by the main processor of the telephone and is designed to ask the processor of the secure element to execute mobile payment applications which are, themselves, contained in the memory of the secure element.

The calling program provides the user with the possibility of choosing one of the mobile payment applications contained in the secure element and of launching this application. To this end, the calling program keeps a key which allows it to call each of the mobile payment applications that the user has chosen. The calling of mobile payment applications is known per se and will not be detailed here.

In accordance with the invention, the calling program is also designed to play a centralizer role in the data exchanges necessary for installing a mobile payment application in the secure element as will be described hereinafter.

Mobile payment applications are authentication applications known per se and will not be detailed further here.

The mobile telephone 1 comprises in a conventional manner means for linking it to a wireless communication network, here the GSM network symbolized by 100.

A first trusted server 10 and a second trusted server 20 are also linked to this network.

The first trusted server 10 is linked via the INTERNET network 200 to servers 30 of providers or of owners of the secure elements (one of these servers is represented here). The first trusted server 10 hosts and executes a first manager program for secure elements. This program is customarily called SEI-TSM (standing for "Secure Element Issuer-Trusted Service Manager).

The second trusted server 20 is linked via the INTERNET network 200 to servers 40 of service providers (such as banks and credit bodies—one of these servers is represented here). The second trusted server 20 hosts and executes a second manager program for mobile payment applications. This program is customarily called SP-TSM (standing for "Service Provider-Trusted Service Manager).

The calling program is linked to the server 40 by a GSM or Internet link (at least 3G) so that the calling program can receive a launch order dispatched by the server 40 (this link 24 is symbolized by dashes in the FIGURE).

The method of the invention is aimed at the deployment of an authentication application in the secure element SE of the mobile telephone 1.

This method implements the transfer, via the GSM communication network 100, of data between the first trusted server 10, the second trusted server 20, and the telephone 1 so as to create in the secure element SE a secure domain SD and install the authentication application therein.

The method according to the invention comprises the steps of:

- establishing a first exchange of data between one of the servers 40 and the calling program so as to transfer an authorization to install the application to the calling program,
- establishing a second exchange of data between the first manager program SEI-TSM and the calling program so as to create the secure domain SD in the secure element SE and transfer a key for access to the secure domain SD to the calling program,
- establishing a third exchange of data between the second manager program SP-TSM and the calling program so as to transfer the access key to the second manager program SP-TSM and
- prohibiting the subsequent use of the access key by the calling program to access the secure domain SD,
- having the second management program SP-TSM download and install the application in the secure domain SD.

During the first exchange of data:

- the calling program dispatches, at the behest of the user, a request seeking the installation of the new mobile payment application. The request is sent by the calling program via the link 24 directly to the server 40 of the service provider concerned in the form of an SMS message (this will also allow the calling program to receive from the server 40 the identification of the SEI-TSM to which it will subsequently have to address itself during the second exchange of data, described further on);
- the service provider verifies that the user fulfils the conditions in order to be allotted the mobile payment application (sufficient financial means for example) and sends its response to the second manager program SP-TSM. If the response is favourable, it is accompanied by customization data in respect of the mobile payment application;
- the second manager program SP-TSM transmits the response via the GSM network 100 to the calling program.

During the second exchange of data:

- the calling program sends a request seeking the creation of the secure domain SD in the secure element SE, the request is sent by the calling program to the first server 10 via the GSM network 100 and comprises an identifier of the mobile telephone and an identifier of the mobile payment application to be installed;
- the first manager program SEI-TSM verifies the technical compatibility of the mobile payment application with the secure element SE of the mobile telephone 1. The first server 10 hosts a database matching identifiers of applications with technical characteristics of the latter and a database matching identifiers of mobile telephones with technical characteristics of the latter. If need be, the first manager program SEI-TSM transmits the request to the server 20 of the provider or owner of the secure element concerned via the INTERNET network 200;
- if the application is compatible with the secure element SE, the first manager program SEI-TSM sends via the GSM network 100 an SMS short message directly to the secure element SE to create therein the secure domain SD;

once the secure domain SD has been created, the first manager program SEI-TSM transmits the key for access to the secure domain SD to the calling program.

The response is transmitted via the GSM network 100.

During the third exchange of data, the calling program transfers the access key to the second management program SP-TSM.

The second manager program SP-TSM prepares a program for installing the application and its configuration with the customization data. The mobile payment application customization data include for example a user name, a limit date of validity, a payment ceiling etc.

The second manager program SP-TSM prohibits the use of the access key by any other than itself to access the secure domain SD. The prohibition of use results here from a modification of the key by the second management program SP-TSM as soon as the key is received. Thus, at no time does the owner of the secure element have access to the secure data sent by the access provider and stored in the secure element.

By virtue of the access key, the second manager program SP-TSM downloads the installation program into the secure domain SD of the secure element SE which executes the installation program so that the application is installed in the secure domain SD.

Of course, the invention is not limited to the embodiments described but encompasses any variant entering within the field of the invention such as defined by the claims.

In particular, although the invention has been described within the framework of a mobile payment application, the invention can also relate to an authentication application with a view to unlocking a lock, for example to access a place or to use a vehicle.

The secure element can be an onboard element, a secure memory card of SMC type, or a memory card of UICC type. The secure element can also be of software type corresponding to the environment of the GLOBALPLATFORM association named "Trusted Execution Environment".

Before being transferred to the calling program, the key for access to the secure domain can be encrypted by the first management program with an intermediate encryption key known to the second management program. The second management program is therefore no longer compelled to modify the access key after the first access to the secure domain. The environment of the GLOBALPLATFORM association incorporates such an encryption process.

In this framework of change of key, the invention is also applicable to any environment similar to that set up by the GLOBALPLATFORM association.

The invention is applicable with a communication terminal such as a communicating tablet or a microcomputer or any other connected object comprising a hardware or software secure element.

Networks other than those mentioned can be used for the implementation of the invention.

It would be possible, moreover, to set up a possibility of sharing a secret between the calling program and the server 40 so that the user is well recognized (in this way one avoids attempted fraud consisting in purloining a first PAN code of a first SIM card so as to load a second card with a second PAN code derived from the first code on a portable telephone). Thus, it is possible to place, in this first exchange of data, a secret between the server and the mobile object (biometric model arising from a photo of the face, of the prints or of the iris, or more simply an access code shared between the service provider and the end user).

It should be noted that the technical eligibility request can be made through a direct connection of the mobile telephone 1 to the server 30 without passing through the first trusted server 10. For example, the mobile telephone 1 asks the operator directly if it is eligible for a secure domain creation type that will have been described to it in the acceptance of banking eligibility. This makes it possible to simplify the streams since the SEI-TSM does not afford any added value, the technical eligibility request data used being stored by the operator itself.

The method can comprise the step, at the end of at least one of the exchanges of data, of having the calling program send a message to a supervisor so as to report on the proper progress of the data exchange in question. For example, after receipt of the access key, such a message can be sent by the calling program to the server of the owner of the secure element.

Authorization for installation can be requested directly by the calling program or via the secure element.

The service for making a location available in the secure element can be billed at the time the access key is sent. Indeed at that time the first trusted server has terminated its work.

It will be noted that the second exchange of data can be used to create at least two secure domains in the secure element. The calling program has been able to request consecutively, with little gap, the installation of two applications of two different application providers. The private communication channel established between the calling program and the first trusted server is then utilized to request the creation of the two secure domains and the sending of one or two access keys to the calling program which will return the access key or keys to the second trusted server.

The invention claimed is:

1. A method for deploying an application in a secure element of a communication terminal comprising a non-secure processing unit executing a program for calling the applications of the secure element; the method comprising the step of transferring via at least one communication network data between a first trusted server associated with a provider of the secure element so as to execute a first program for managing the security element, a second trusted server associated with at least one applications provider so as to execute a program for managing applications of the secure element, and the communication terminal, so as to create in the secure element a secure domain and install the application therein; characterized in that the method comprises the steps of:

establishing a first exchange of data between the applications provider and the calling program so as to obtain an application installation authorization;

establishing a second exchange of data between the first management program and the calling program so as to create the secure domain in the secure element and transfer a key for access to the secure domain to the calling program, establishing a third exchange of data between the second management program and the calling program so as to transfer the access key to the second management program and have the second management program download and install the application in the secure domain, prohibiting the use of the access key by any other than the second management program to access the secure domain, data exchanges being opened between the calling program and the management programs of the trusted servers so that the trusted servers have no direct dialogue with one another.

2. The method according to claim 1, in which the prohibition of use results from a modification of the key by the second management program after the latter has accessed the secure domain a first time.

3. The method according to claim 1, in which the prohibition of use of the key is performed just after the second manager program has taken possession of the key before the downloading of the application into the secure domain.

4. The method according to claim 1, comprising the step, at the end of at least one of the exchanges of data, of having the calling program send a message to a supervisor to report on the proper progress of the data exchange in question.

5. The method according to claim 1, in which the second exchange of data is used to create at least two secure domains in the secure element.

6. The method according to claim 1, wherein during the second exchange of data:
the calling program sends a request seeking the creation of the secure domain in the secure element, the request comprising an identifier of a mobile telephone and an identifier of the application to be installed;
the first manager program verifies the technical compatibility of the mobile payment application with the secure element of the mobile telephone;
if the application is compatible with the secure element, the first manager program sends via a GSM network an SMS short message directly to the secure element to create therein the secure domain;
once the secure domain SD has been created, the first manager program transmits the key for access to the secure domain to the calling program.

7. The method according to claim 6, wherein the first manager program verifies the technical compatibility of the application with the secure element by using a database matching identifiers of applications with technical characteristics of the latter and a database matching identifiers of mobile telephones with technical characteristics of the latter.

8. The method according to claim 6, wherein the first manager program transmits the request seeking the creation of the secure domain in the secure element to the provider of the secure element.

* * * * *